United States Patent [19]

Günther et al.

[11] Patent Number: 5,615,230
[45] Date of Patent: Mar. 25, 1997

[54] PROCESS FOR TRANSMITTING DIGITAL SIGNALS WHICH COMBINES ADVANTAGES OF OQPSK AND π/4-QPSK

[75] Inventors: Christoph Günther, Fislisbach, Switzerland; Joachim Habermann, Wetzlar, Germany

[73] Assignee: ASCOM Tech AG, Bern, Switzerland

[21] Appl. No.: 392,505

[22] Filed: Feb. 23, 1995

[30] Foreign Application Priority Data

Mar. 1, 1994 [CH]  Switzerland ......................... 00596/94

[51] Int. Cl.$^6$ ................................................. H04L 27/18
[52] U.S. Cl. ........................ 375/281; 375/283; 375/331
[58] Field of Search ................................. 375/283, 331, 375/281, 332, 341

[56] References Cited

U.S. PATENT DOCUMENTS

| | | | |
|---|---|---|---|
| 3,924,186 | 12/1975 | Gordy et al. | 375/283 |
| 4,338,579 | 7/1982 | Rhodes | 332/21 |
| 5,007,068 | 4/1991 | Simon et al. | 375/283 |
| 5,379,323 | 1/1995 | Nakaya | 375/331 |

FOREIGN PATENT DOCUMENTS

| | | |
|---|---|---|
| A0334661 | 9/1989 | European Pat. Off. . |
| 007251 | 1/1985 | Japan . |

OTHER PUBLICATIONS

IEEE International Conference on Communications—ICC/89, Boston, MA, USA, 11–14 Jun. 1989. vol. 3, pp. 1660–1664, XP 000075420, Deely K. et al.: 'Differential Detection of the OQPSK Signal: Coding and Decoding';.
IEEE Transactions on Vehicular Technology, vol. 41, No. 4, 1. Nov. 1992, pp. 401–406, XP 000362354, Ghassan Kawas Kaleh: 'Differential Detection Via the Viterbi Algorithm for Offset Modulation and MSK–Type Signals';.
39th IEEE Vehicular Technology Conference (IEEE Ct. No. 89CH2739–1), San Francisco, CA, USA, 1–3 May 1989, 1989, New York, NY, USA, IEEE USA pp. 83–94 vol. 1,LIU C–L ET AL 'Noncoherent detection of pi/4–QPSK systems in a CCI–AWGN combined interference environment';.
1973 National Telecommunications Conference, vol. II, Atlanta, GA, USA, 26–28 Nov. 1973, 1973, New York, NY, USA, IEEE, USA, pp. 32A/1–8, Rhodes S A 'Performance of offset–QPSK communications with partially–coherent detection';.
IEEE Transactions on Communications, Dec. 1980, USA, vol. COM–28, Nr. 12, ISSN 0090–6778, pp. 1999–2009, Morais D. H. et al.: 'The effects of filtering and limiting on the performance of QPSK, offset QPSK, and MSK systems';.
VTC 1994. 'Creating Tomrrow's Mobile Systems'. 1994 IEEE 44th Vehicular Technology Conference (Cat. No. 94CH3438–9), Proceedings of IEEE Vehicular Technology Conference (VTC), Stockholm Sweden, 8–10 Jun. 1994, ISBN 0–7803–1927–3, 1994, New York, NY, USA, IEEE, USA, pp. 1542–1546, vol. 3, Gunther C. C. et al.: 'DOQPSK–Differential Demodulation of Filtered Offset QPSK'.

*Primary Examiner*—Stephen Chin
*Assistant Examiner*—Jeffrey W. Gluck

[57] ABSTRACT

A process for transmitting digital signals, in which the digital data are coded differentially in symbols of a symbol period $T_s$ (2.1, 2.2), the symbols transmitted with the Q component being delayed by $T_s/2$, relative to those of the I component, to achieve a time-staggering. A cross interference of the I and Q components, occurring on the receiver end and caused by the differential coding nd the time staggering, is resolved with a trellis decoder (10), for example. As a result, a differential offset QPSK process achieved on this basis combines the advantages of DQPSK and OQPSK procedures.

2 Claims, 3 Drawing Sheets

| $Z_A$ | $Z_E$ | $X_{2k} = X_{2k+1}$ | $Y_{2k} = -Y_{2k+1}$ |
|---|---|---|---|
| 1  1  1  1 | 1  1  1  1 | 2 | 0 |
| 1  1  1  1 | 1  1  1 -1 | 1 | -1 |
| 1  1  1 -1 | 1  1 -1  1 | 0 | 2 |
| 1  1  1 -1 | 1  1 -1 -1 | -1 | 1 |
| 1  1 -1  1 | 1 -1  1  1 | 1 | 0 |
| 1  1 -1  1 | 1 -1  1 -1 | 1 | -1 |
| 1  1 -1 -1 | 1 -1 -1  1 | -1 | 0 |
| 1  1 -1 -1 | 1 -1 -1 -1 | -1 | -1 |
| 1 -1  1  1 | -1  1  1  1 | 0 | -2 |
| 1 -1  1  1 | -1  1  1 -1 | -1 | -1 |
| 1 -1  1 -1 | -1  1 -1  1 | 2 | 0 |
| 1 -1  1 -1 | -1  1 -1 -1 | 1 | 1 |
| 1 -1 -1  1 | -1 -1  1  1 | -1 | 0 |
| 1 -1 -1  1 | -1 -1  1 -1 | -1 | 1 |
| 1 -1 -1 -1 | -1 -1 -1  1 | 1 | 0 |
| 1 -1 -1 -1 | -1 -1 -1 -1 | 1 | 1 |

Fig. 5

PROCESS FOR TRANSMITTING DIGITAL SIGNALS WHICH COMBINES ADVANTAGES OF OQPSK AND π/4-QPSK

PRIOR ART

In past years, offset QPSK (OQPSK) and π/4-QPSK were studied in detail for applications in digital mobile radiotelephone service. Based on such studies, e.g., π/4-QPSK was specified for the second-generation U.S. TDMA standard. The same modulation format is also used in the Japanese cellular mobile radiotelephone service (JDC) and the European mobile radiotelephone service TETRA. The following two reasons, inter alia, spoke in favor of this choice: in the first place, the envelope curve of π/4-QPSK signals does not have any zero crossings, which reduces the generation of harmonics and the signal distortion by nonlinearities of the amplifier. The avoidance of harmonics is important here for the overall performance of the system, while the distortions caused by nonlinear amplification are important for the transmitting quality of a connection. A second argument in favor of π/4-QPSK is the possibility of differential coding and correspondingly simpler differential demodulation. This is above all very advantageous if the carrier phase of the receiving signal changes quickly, which is very often the case for mobile radiotelephone channels.

In comparison with π/4-QPSK, OQPSK has a great deal smaller fluctuations of the envelope. Therefore, in nonlinear channels it comes off better than π/4-QPSK. But since no differential demodulation was previously available for OQPSK, in each case π/4-DQPSK was preferred.

SUMMARY OF THE INVENTION

The object of the invention is now to indicate a process of the type mentioned initially, which combines the advantages of OQPSK with those of π/4-QPSK.

A process of the mentioned type is distinguished according to the invention by the following steps:

a) Digital data are coded differentially in symbols of a symbol period $T_s$;

b) the symbols are transmitted with I and Q components time-staggered;

c) a cross interference of I and Q components, occurring on the receiver end and caused by the time staggering, by filtering and a differential decoding, is resolved.

Within the scope of the invention, a receiver-end cross interference is thus intentionally permitted. But—since its nature is known—it can be resolved. Preferably, precautions are already taken on the transmitter end, so that the cross interference can be resolved at the smallest possible expense.

To resolve the cross interference, a trellis decoding is preferred. But also processes other than those known for resolving interferences are also usable, such as, e.g., the so-called sequential decoding (cf. in this connection "Error Control Coding," Lin and Costello, Prentice Hall, 1983, pp. 350 to 384).

I and Q components are advantageously staggered corresponding to a half symbol period $T_s/2$. For this purpose, an appropriate time-delay element of the shaping of pulses can be provided in the I or Q branch of the transmitter. On the receiver end, I and Q components each are scanned with the half symbol period.

Preferably, I and Q components are transmitted with a PSK modulation, especially a QPSK modulation. But other types of modulation are not excluded in principle.

To keep the interference small, it is advisable to subject I and Q components to a Nyquist shaping of pulses. Preferred are pulse shapes such as "square root raised cosine." But it is also suggested to replace, e.g., the "raised cosine" pulse in the I component by a cosine pulse and in the Q component by a sine pulse. Then, an MSK (minimum shift keying) modulation results.

The trellis decoding preferably works with sixteen phases, in which the decoding is performed based on the table indicated further below. (The invention is not limited here, of course, to the decoding according to the table indicated by way of example. Based on the detailed description, one skilled in the art can easily determine the decoding schemes that are suitable for the respective application.) In this special case, the shaping of pulses takes place preferably with an SRRC pulse with roll-off factor between 0.3 and 1.

Two signal components $X_k$ and $Y_k$, preceding the trellis decoding, can be determined from values $I_k$, $I_{k-2}$, $Q_k$, $Q_{k-2}$ of the I or Q components scanned with half symbol period $T_s/2$ according to the following formulas:

$$X_k = I_k I_{k-2} + Q_k Q_{k-2}$$

$$Y_k = Q_k I_{k-2} - I_k Q_{k-2}.$$

The invention is suitable in particular for mobile radiotelephone service systems. In this case, in the receiver circuit, a differential coding and a time-staggered timing of I and Q components are to be provided. On its part, the receiver circuit exhibits a suitable circuit to resolve the cross interference (e.g., a trellis decoding). The invention can be performed with integrated circuits, and preferably by programming software. Further advantageous embodiments and feature combinations of the invention follow from the following detailed description and the totality of the claims.

BRIEF DESCRIPTION OF THE DRAWINGS

Below, the invention is to be explained in more detail based on the exemplary embodiments and in connection with the drawings. There are shown in:

FIG. 5 a table for the trellis decoding.

DETAILED DESCRIPTION OF THE PREFERRED EMBODIMENTS

Figure 1:
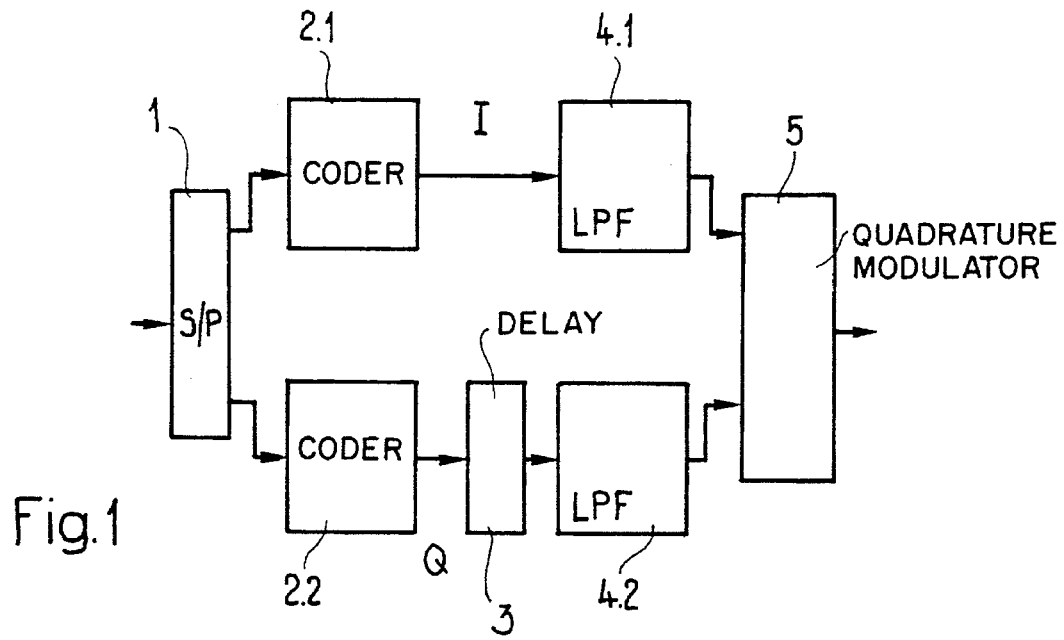
FIG. 1 a transmitter block diagram.

FIG. 1 shows a block diagram of a transmitter for performing the process according to the invention. Here, only the processing blocks important to the invention are represented in detail.

The digital data to be transmitted are first distributed by a coder 1 to in-phase component I and quadrature component Q. This takes place in the simplest way by alternate assignment of incoming data to the I and Q components, and the symbols both in the I component and in the Q component have a symbol period $T_s$.

Next, a differential coding with coders 2.1, 2.2 follows separately for inphase and quadrature branches. The differential coding is known as such and does not need to be explained in more detail in this connection.

The Q component is then delayed by a time-delay element 3 by a half symbol period $T_s/2$. This results in a time staggering of the data transmission in the two signal components.

Next, the signals are filtered with pulse shapers 4.1, 4.2. According to a preferred embodiment, an SRRC pulse shape (square root raised cosine) is used for this purpose. The signals band-limited in this way are fed to a quadrature modulator 5, which generates a QPSK-modulated transmission signal.

Figure 2:
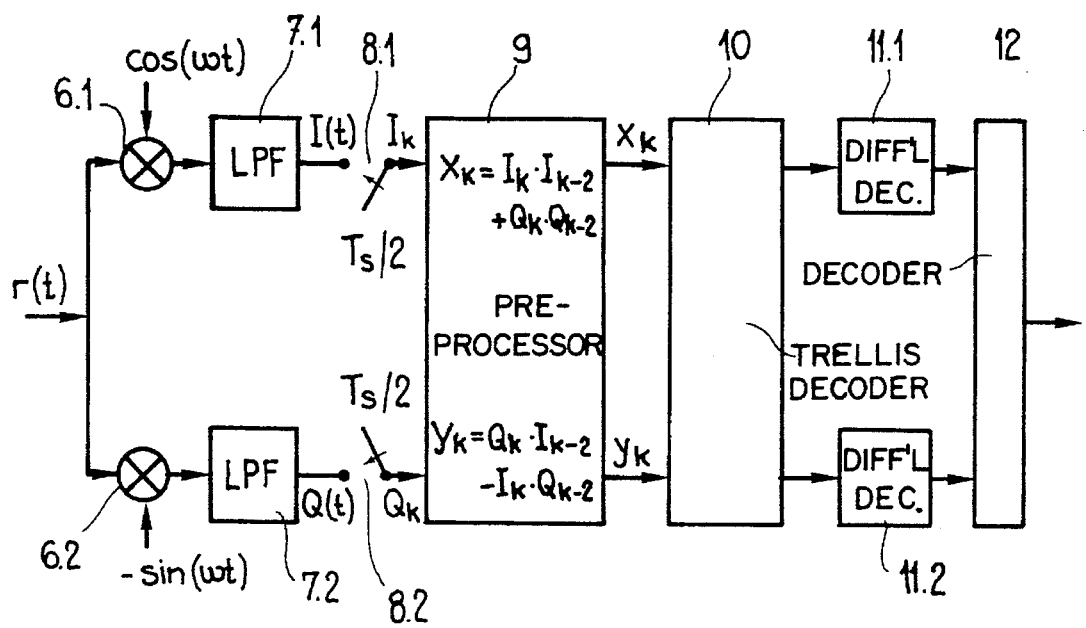
FIG. 2 a receiver block diagram.

FIG. 2 shows a receiver block diagram for demodulation of a noise-encumbered receiving signal r(t). Incoming receiving signal r(t) is mixed down to baseband with the help of mixers 6.1, 6.2, and a separation into I and Q components takes place. This separation into I and Q components is not normally identical with that at the transmitter. (Were the latter known, a coherent demodulation could be performed, and the problem would be trivial). In the baseband, the two signal components are each low-pass-filtered with a filter 7.1, 7.2. In this case, SRRC filters are preferably used. The resulting I and Q signals I(t) or Q(t) are scanned twice per symbol period (cf. scanner 8.1, 8.2).

Next, scanning values $I_k$ and $Q_k$ are preprocessed in the sense of the formulas below:

$$X_k = I_k I_{k-2} + Q_k Q_{k-2} \qquad (I)$$

$$Y_k = Q_k I_{k-2} - I_k Q_{k-2} \qquad (II)$$

Based on values $X_k$ and $Y_k$, a trellis decoder 10 can resolve the cross interference between I and Q components.

After the trellis decoding, the coding of coders 2.1, 2.2 (cf. FIG. 1) is reversed with two differential decoders 11.1, 11.2. But as an alternative to this, the differential decoding is combined with the trellis decoding, and thus the differential coding is reversed virtually in one step. (Decoders 11.1, 11.2 then no longer appear as independent blocks, since their function is integrated in the trellis decoding.) But in this case, which is closer to the optimal decoding, the trellis looks different. It then leads directly to determining symbols $\alpha_k, \beta_k$, and the latter are determined by the phases of the trellis, which are visited by the best path.

A decoder 12 finally combines the estimated symbols of the two signal paths in a manner inverting the function of coder 1.

The resolution of the cross interference of I and Q components is explained in detail below.

In the transmitter, a serial stream of data (alpha$_0$, beta$_0$, alpha$_1$, beta$_1$, ... ) with a data rate $1/T_b$ is divided into an I stream and a Q stream {alpha$_k$} and {beta$_k$}. The alpha's and beta's are {+1, −1} representations of the bits. The bits of the I stream and the Q stream are coded differentially as follows:

$$x_{2k} = \Pi_{j \leq k} \alpha_j; \quad y_{2k+1} = \Pi_{j \leq k} \beta_j.$$

In the receiver, the situation looks as follows:

In an even-numbered scanning interval $l=2k$, both signal values $X_{2k}$ and $Y_{2k}$ are functions of transmitted symbols $y_{2k-3}, x_{2k-2}, y_{2k-1}, x_{2k}$ and $y_{2k+1}$. Crossovers from an initial phase $(y_{2k-3}, x_{2k-2}, y_{2k-1}, x_{2k})$ to a final phase $(x_{2k-2}, y_{2k-1}, x_{2k}, y_{2k+1})$ are now considered. Were no noise present, values of $X_{2k}$ and $Y_{2k}$ would be assigned to these crossovers according to the following equations:

$$X_{2k} = x_{2k} x_{2k-2} + \tfrac{1}{2}(y_{2k-1} + y_{2k+1})(y_{2k-3} + y_{2k-1}) \qquad (III)$$

$$Y_{2k} = \tfrac{1}{2}(x_{2k-2}(y_{2k-1} + y_{2k+1}) - x_{2k}(y_{2k-3} + y_{2k-1})) \qquad (IV)$$

In a similar way, crossovers from an initial phase $(x_{2k-2}, y_{2k-1}, x_{2k}, y_{2k+1})$ to a final condition $(y_{2k-1}, x_{2k}, y_{2k+1}, x_{2k+2})$ at the odd-numbered scanning moments are considered.

Here, there is shown that $$X_{2k+1} = X_{2k} \qquad (V)$$

$$Y_{2k+1} = -Y_{2k} \qquad (VI)$$

applies, if identical initial and final phases at odd-numbered and even-numbered scanning moments are considered. This means that the trellis with sixteen phases and two crossovers is essentially time-invariant from and to each node.

The table according to FIG. 5 shows the crossovers and the assigned values for X and Y ($Z_A$=initial phase, $Z_E$=final phase). Since both X and Y are invariant, if initial phase and final phase are replaced by their complementary phase, e.g., (1,1,−1,1)—>(−1,−1,1,−1), only the first eight crossovers are included.

It is to be noted that two output signals X and Y of predecoder 9 can assume four or five values instead of the three values in the case of DQPSK.

Trellis decoding 10 preferably works with a Euclidian metric. The metric increment is the square Euclidean distance between values $X_1$ and $Y_1$ and the values from the table.

To determine an estimated data value, in each case the path with the best (accumulated) metric value for the further processing is selected—in a way known in the art—and the oldest symbol of the observation period of the path with the overall best metric (cf. Viterbi algorithm) is displayed.

It is clear that the decoding according to the table itself in the case of an AWGN channel represents an approximation, since the SRRC filtering in the receiver contaminates the white noise and since the noise is no longer Gaussian after the nonlinear differential preprocessing. At a high signal-noise distance, the deviations in the white Gaussian noise can be disregarded.

The trellis decoding according to the table is based on a roll-off factor r=1. Another value for r would actually result in another phase diagram. Especially if both Nyquist criteria are no longer met, it is possible to work with a certain in-phase value with a so-called reduced phase-decoding diagram based on the infinite number of interfering symbols of the Q component. As the simulation results explained below show, the trellis decoding according to the table can also be used for a roll-off factor r<1, without serious losses having to be tolerated.

Figure 3:
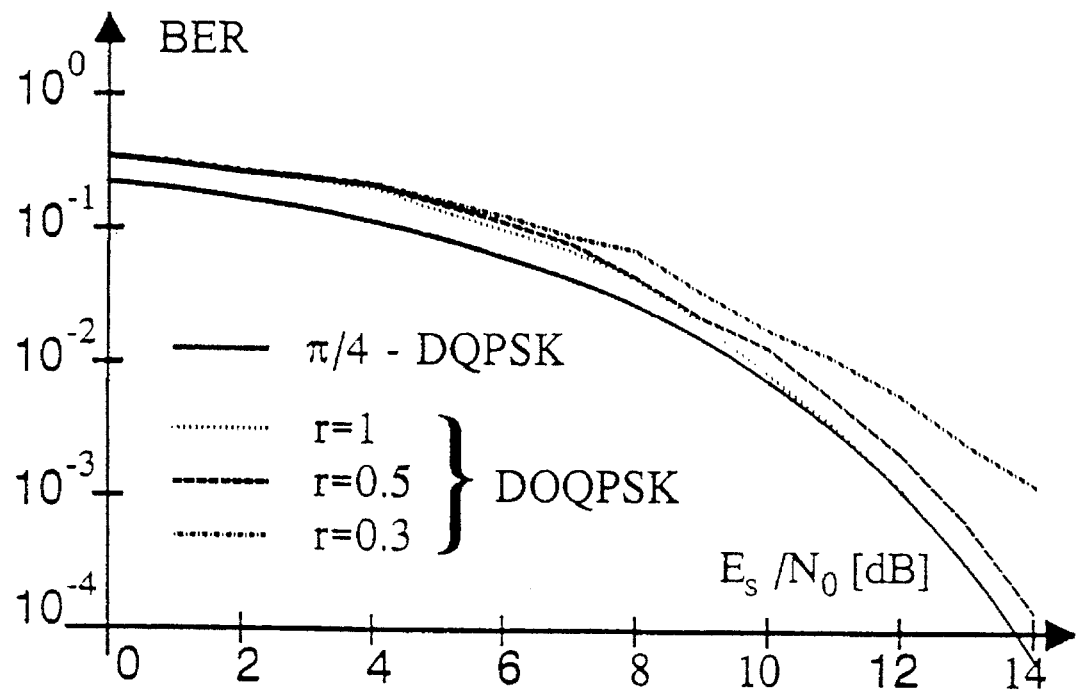
FIG. 3 bit error rates for DQPSK and DOQPSK in the AWGN channel.

FIG. 3 shows bit error rates for π/4-DQPSK and DOQPSK in an AWGN channel. Simulations were performed with a roll-off factor of r=1, r=0.5 and r=0.3. FIG. 3 clearly shows that at a high signal-noise distance $E_b/N_0$, the bit error rates for DOQPSK and π/4-DQPSK converge. It is noteworthy that a roll-off factor of r=0.5 in the range of interest results only in a falling off of performance of about 0.5 dB. The performance worsens in the case of a roll-off factor of r=0.3, since the elevated intersymbol interference results in an irreducible error rate, which becomes increasingly more perceptible. For the transmission of digitized voice signals, a roll-off factor of r=0.3 with the r=1 decoder can very well be used.

Figure 4:
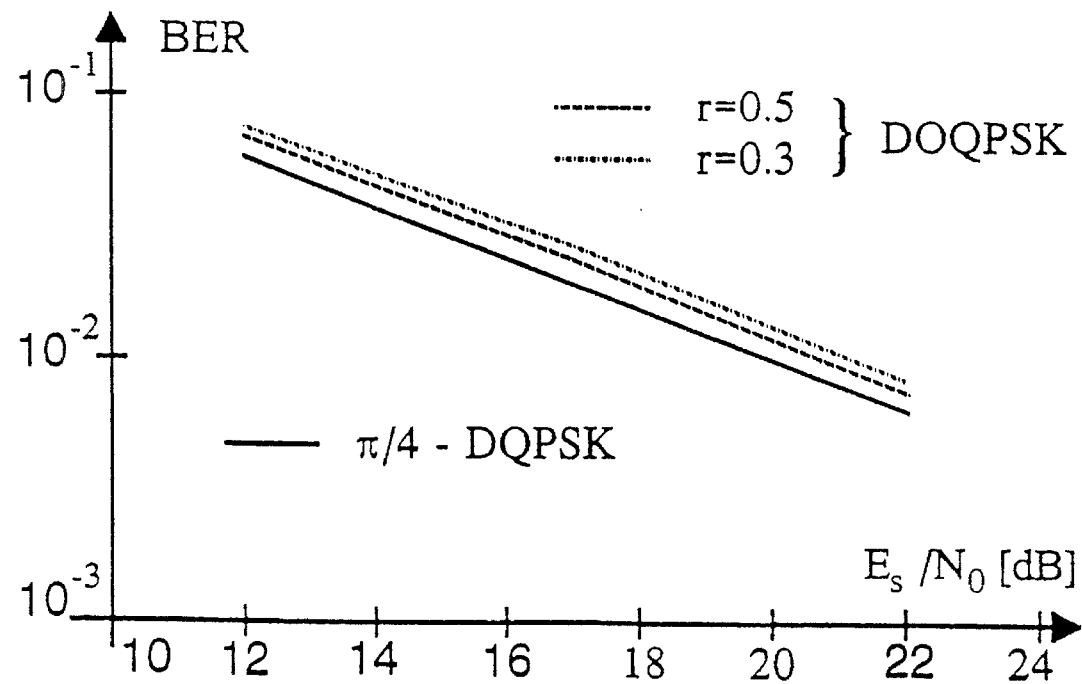
FIG. 4 bit error rates for DQPSK and DOQPSK under "fast Rayleigh fading" conditions.

FIG. 4 shows simulation results for a channel with Rayleigh fading and Jakes Doppler spectrum. The product from Doppler frequency shift $f_d$ and symbol period $T_s$ was set at 0.007. At 900 MHz and a data rate of 36 Kbit/s, this corresponds to a motor vehicle speed of about 150 km/h. From FIG. 4, it can be seen clearly that DOQPSK—as in the AWGN channel—works only insignificantly poorer than π/4-DQPSK. Thus, the DOQPSK process according to the invention combines the advantages of DQPSK and OQPSK signal transmissions. The invention is not limited to the example explained in detail. Based on the explanations, it is easily possible for one skilled in the art, depending on the selected pulse shape and in coordination with the modulation process, to draw up a suitable table for the trellis decoding.

In summary, it can be noted that DOQPSK can be used with similar advantages in mobile radiotelephone service and other signal transmission systems, such as DQPSK.

The invention claimed is:

1. A process for transmitting digital signals comprising the following steps:

coding data to be transmitted into inphase I and quadrature Q components;

differentially encoding the inphase and quadrature components separately into symbols, each symbol having a symbol period $T_s$;

staggering the encoded I and Q components with half a symbol period $T_s/2$;

filtering each of the I and Q components by SRRC pulse shaping;

feeding the filtered I and Q components to a modulator generating a QPSK modulated transmission signal;

receiving the transmission signal and mixing it down into the baseband;

filtering I and Q components from the baseband in respective SRRC-type low pass filters;

scanning the filtered I and Q components twice per symbol period $T_s$;

preprocessing the scanned values $I_k$, $I_{k-2}$, $Q_k$, $Q_{k-2}$ of the I and Q components according to the formulas, $X_k = I_k I_{k-2} + Q_k Q_{k-2}$ $Y_k = Q_k I_{k-2} + I_k Q_{k-2}$ decoding according to the 16 phases of the following table, in which $Z_A$ represents an initial phase, and $Z_E$ represents a final phase:

| $Z_A$ | | | | $Z_E$ | | | | $X_{2K} = X_{2K+1}$ | $Y_{2K} = -Y_{2K+1}$ |
|---|---|---|---|---|---|---|---|---|---|
| 1 | 1 | 1 | 1 | 1 | 1 | 1 | 1 | 2 | 0 |
| 1 | 1 | 1 | 1 | 1 | 1 | 1 | -1 | 1 | -1 |
| 1 | 1 | 1 | -1 | 1 | 1 | 1 | 1 | 0 | 2 |
| 1 | 1 | 1 | -1 | 11 | -1 | -1 | -1 | 1 | |
| 1 | 1 | -1 | 1 | 1 | -1 | 1 | 1 | 1 | 0 |
| 1 | 1 | -1 | 1 | 1 | -1 | 1 | -1 | 1 | -1 |
| 1 | 1 | -1 | -1 | 1 | -1 | -1 | 1 | -1 | 0 |
| 1 | 1 | -1 | -1 | 1 | -1 | -1 | -1 | -1 | -1 |
| 1 | -1 | 1 | 1 | -1 | 1 | 1 | 1 | 0 | -2 |
| 1 | -1 | 1 | 1 | -1 | 1 | 1 | -1 | -1 | -1 |
| 1 | -1 | 1 | -1 | -1 | 1 | -1 | 1 | 2 | 0 |
| 1 | -1 | 1 | -1 | -1 | 1 | -1 | -1 | 1 | 1 |
| 1 | -1 | -1 | 1 | -1 | -1 | 1 | 1 | -1 | 0 |
| 1 | -1 | -1 | 1 | 1 | -1 | 1 | -1 | -1 | 1 |
| 1 | -1 | -1 | -1 | -1 | -1 | -1 | 1 | 1 | 0 |
| 1 | -1 | -1 | -1 | -1 | -1 | -1 | -1 | 1 | 1. |

2. A device for transmitting digital signals from a transmitter to a receiver, comprising: in the transmitter:

a coder for coding data into in-phase I and quadrature Q components;

differential coders differentially encoding the respective in-phase and quadrature components separately into symbols, each symbol having a symbol period $T_s$;

a time delay element for staggering the encoded I and Q components with half a symbol period $T_s/2$;

pulse shapers for filtering each of the I and Q components by an SRRC pulse shape; and a quadrature modulator for generating a QPSK modulated transmission signal in accordance with the pulse-shaped I and Q components:

and in the receiver:

mixers for mixing the received transmission signal down to baseband;

SRRC-type low-pass filters for respectively filtering I and Q components of the received transmission signal at baseband;

scampers for respectively scamping the I and Q components twice per symbol period;

a predecoder for preprocessing the scanned values $I_k$, $I_{k-2}$, $Q_k$ and $Q_{k-2}$ of the I and Q components according to the formulas, $X_k = I_k I_{k-2} + Q_k Q_{k-2}$ $Y_k = Q_k I_{k-2} - I_k Q_{k-2}$;

a decoder for decoding outputs of the predecoder according to the sixteen phases of the following table, in which $Z_A$ represents an initial phase and $Z_E$ represents a final phase:

| $Z_A$ | | | | $Z_E$ | | | | $X_{2K} = X_{2K+1}$ | $Y_{2K} = -Y_{2K+1}$ |
|---|---|---|---|---|---|---|---|---|---|
| 1 | 1 | 1 | 1 | 1 | 1 | 1 | 1 | 2 | 0 |
| 1 | 1 | 1 | 1 | 1 | 1 | 1 | -1 | 1 | -1 |
| 1 | 1 | 1 | -1 | 1 | 1 | -1 | 1 | 0 | 2 |
| 1 | 1 | 1 | -1 | 11 | -1 | -1 | -1 | 1 | |
| 1 | 1 | -1 | 1 | 1 | -1 | 1 | 1 | 1 | 0 |
| 1 | 1 | -1 | 1 | 1 | -1 | 1 | -1 | 1 | -1 |
| 1 | 1 | -1 | -1 | 1 | -1 | -1 | 1 | -1 | 0 |
| 1 | 1 | -1 | -1 | 1 | -1 | -1 | -1 | -1 | -1 |
| 1 | -1 | 1 | 1 | -1 | 1 | 1 | 1 | 0 | -2 |
| 1 | -1 | 1 | 1 | -1 | 1 | 1 | -1 | -1 | -1 |
| 1 | -1 | 1 | -1 | -1 | 1 | -1 | 1 | 2 | 0 |
| 1 | -1 | 1 | -1 | -1 | 1 | -1 | -1 | 1 | 1 |
| 1 | -1 | -1 | 1 | -1 | -1 | 1 | 1 | -1 | 0 |
| 1 | -1 | -1 | 1 | -1 | 1 | -1 | -1 | -1 | 1 |
| 1 | -1 | -1 | -1 | -1 | -1 | -1 | 1 | 1 | 0 |
| 1 | -1 | -1 | -1 | -1 | -1 | -1 | -1 | 1 | 1 | and differential decoders for differentially decoding the results of the decoder.

* * * * *